May 27, 1958     E. L. SAPP     2,836,475

CONNECTED TABLES

Filed June 20, 1956

*Elton L. Sapp*
INVENTOR.

BY *Hal H. M<sup>c</sup>Cayhun*
*attorney*

2,836,475
CONNECTED TABLES

Elton L. Sapp, West Palm Beach, Fla.

Application June 20, 1956, Serial No. 592,635

2 Claims. (Cl. 311—4)

This invention relates to class-room furniture, and more particularly is directed towards individual class-room furniture adaptable to group activities, and teaching methods employing such equipment.

In the class-room teaching of small children exceptional children, such as spasmics, or retarded children, the modern theory is to provide each student with an individual desk or chair with desk top attached; and, also, permit the students to move, their desk or desk-type chair with other students for group activities, either a common project one group has in progress or for separation of different classes in the same room, or different degrees of progress within the same class.

The theory and practice of this type of teaching has proven its advantages, but the equipment and furniture of the class-room has proven inadequate and posed many limitations and disadvantages.

Accordingly, an object of this invention is to provide individual furniture for such students that interlock to provide a common surface for group activity of several students; and teaching method involving such equipment.

Another object of this invention is to provide classroom furniture of the class described which may be interlocked and released by small children or retarded children.

Another object of this invention is to provide classroom furniture of the class described which will unite in substantial rectangular design.

A further object of this invention is to provide classroom furniture of the class described which will unite to form a group activity unit in which all students at the unit may face or view in the same direction.

A still further object of this invention is to provide devices of the class described and adaption of old devices to the new devices, which will be economical and simple in construction and efficient and durable in use.

The foregoing and other objects and advantages of this invention will be more apparent from the following specifications, in conjunction with the drawings forming a part thereof, wherein.

Referring to the drawings, wherein like members are given the same reference numeral, rectangular table top, desk top, or the like, 1, has a length preferably equal to twice the width.

The table top, desk top, or the like, 1, has one side plain, or the front at which a student sits; the end of the table to the student's right has a male member 2, of a two member separable inter-locking device, and the end of the table to the student's left has a female member 3 of the two member inter-locking device. The members are placed on the mid-line of the table, so that when joined, the table thus formed from the two or more tables will be rectangular, a standard design or pattern.

In tables having the preferred dimensions of length twice the width, there are placed on the back or side of the table opposite the student, a male member 2 and a female member 3. These members are spaced a half width from the ends, with the male members 2 to the student's right and the female member 3 to the student's left.

Figure 6:
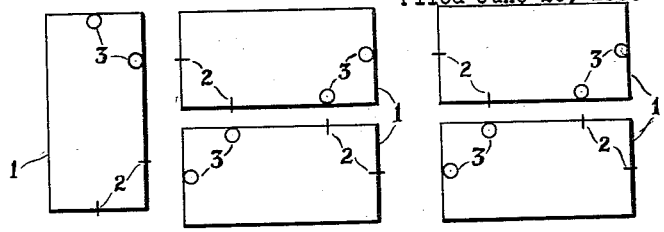
Fig. 6 is a diagrammatic view of the grouping on Fig. 5 in disconnected relationship.
Figure 4:
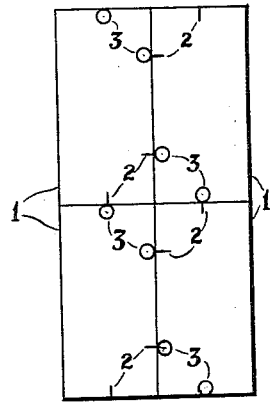
Figs. 3, 4 and 5 are diagrammatic views of desks or tables, having lengths twice their widths, interlocked in different grouping, in which the "O's" represent the position of female elements of interlocking devices, and the "I's" represent the position of male elements of interlocking devices.
Figure 5:
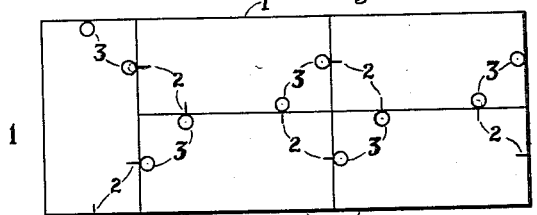
Figure 3:
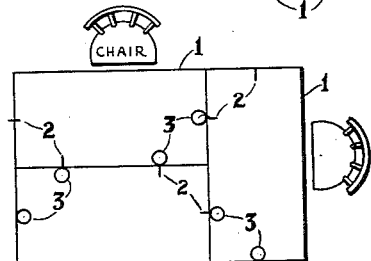
Figure 7:
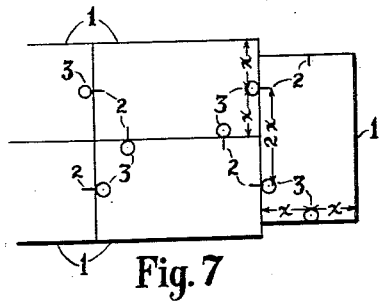
Fig. 7 a diagrammatic view similar to Figs. 3, 4 and 5 of desks or tables inter-locked in a grouping in which the desks' or tables' lengths are not twice their width, to show the positioning of the male and female elements of the inter-locking devices.

Thus tables may be grouped and interlocked in any number, as illustrated in Figs. 3, 4 and 5, and always form a resultant rectangular design.

Where old substantial rectangular tables, desks, and the like are being adapted to this method of group activity teaching, in which the lengths are not equal to twice the widths, the end male and female members divide the width equally, as illustrated in Fig. 7 so as to be by the distance "X" from each long edge of the table. The back male and female members are each positioned equal distance from the ends of the table, with a distance of twice "X" between them, as shown in the Fig. 7 at the distance 2X. In other words, the back male and female members are spaced apart a distance equal to the length of a side edge.

These interlocking members 2 and 3 are shown mounted beneath the table top, the preferred location, but they can be mounted elsewhere depending upon the students involved. For example, when teaching blind students, it may be desirable to place the interlocking members on top or on the edges.

The male and female members 2 and 3 may be positioned differently than the preferred illustrated positioned. The requirement is that the male members 2 shall both be on the same side of the student, right or left, and the female members 3 shall be on the other side of the student.

The end members both male 2 and female 3 shall be the same distance from the front or student side edge of the table. In the prefered embodiment where the table length is twice its width, the male member 2 and female member 3 on the back of the table are positioned the same distances from the respective ends of the table as the end members are from the front of the table.

In other designs, in which the table length is not equal to twice its width, the preceding positioning of members will permit end-to-end and back-to-back joining but not back-to-ends, unless mathematical determinations are made to ascertain proper positioning. The X and 2X mathematical determination, of course, is operable in all cases; i. e., the distance between the back male and female members is always equal to the length of an end edge, and the male or female member at each table end is always placed equidistantly from the front and back edges.

Figure 1:
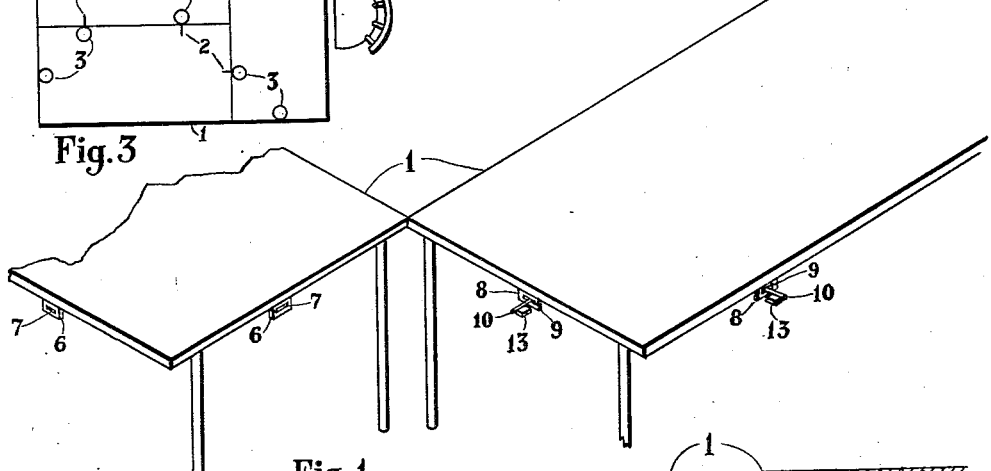
Fig. 1 is an isometric view of two desks or tables showing inter-locking features.
Figure 2:
Fig. 2 is a cross-sectional view of two desk or table tops joined by inter-locking elements shown in elevation.

Various standard interlocking devices may be used, such as hook-and-eye, bracket-and-pivot bolt, detent plunger-and-spring clamp. Since the invention is primarily concerned with class-room activities, a preferred interlocking device is illustrated in Figs. 1 and 2.

In this preferred embodiment, the female member of the interlocking devices comprises a bracket or depending projection 6 secured to the table top in any conventional manner such as screwed, glued, welded, as may be indicated from material employed. This bracket or projection 6 has an elongated aperture 7 therein. The male member of the interlocking device comprises a bracket or projection 8 having an elongated aperture 9, the same as bracket 6 and aperture 7 of the female member and the brackets are interchangeable. A spring loaded key completes the male member. This key comprises a shaft 10 having a coil spring 11 therearound, a handle 12 on one end of the shaft 10, and a projection 13 extending therefrom, preferably perpendicular to the shaft 10 and in the plane of the handle 12.

In operation, the device and procedure is quite simple. From individual positioning, one or more tables 1 may be moved to end-to-end relationship, back-to-back relationship, or back-to-back and back-to-end relationship. The handle 12 is turned a quarter turn to position the key projection 13 in alignment with the aperture 6. By pressing the handle 12 against the action of the spring 11, the projection 13 is inserted through the aperture 6, and, by returning the handle 12 a quarter turn the projection 13 is locked behind the bracket 6. To release, the handle 12 is turned a quarter turn, and the projection 13 is pulled through the aperture 6.

Thus the device of this invention provides a means of group activity education, permitting individual expression and psychological adjustment of the student, while maintaining an orderly organization from prior chaos.

The invention has been described in detail, but it is understood that it is not so limited. Many changes can be made in the mechanism without departing from the spirit and scope of the invention.

Having thus described the invention what is claimed as new and desired to secure by grant of Letters Patent is:

1. An interlocking class room table comprising a rectangular top member having front and back edges longer than its end edges and having interlocking means adjacent its back and end edges for connecting said table with like tables in end to end, back edge to back edge, and end to back edge arrangement, said interlocking means comprising interlockable male and female elements, a first of said female elements being positioned at the midpoint of one end edge, a first of said male elements being positioned at the midpoint of the opposite end edge, a second female element and a second male element being positioned along said back edge, each equally distant from opposite table ends and spaced apart a distance equal to the length of said end edge, said second female element being adjacent said first female element and said second male element adjacent said first male element; whereby a pair of said tables may be connected in abutting back edge to back edge relationship, a second pair of said tables may be connected to said first pair in abutting end edge to end edge arrangement, and a fifth like table may be connected across the exposed ends of one of said pairs of tables with the back edge of said fifth table abutting the end edges of said last-named pair of tables.

2. An interlockable class room table in accordance with claim 1 wherein each of said interlockable female elements comprises a vertical wall extending perpendicularly to the top surface of said top member and parallel to the adjacent table edge, said wall having an elongate keeper slot therethrough, and each of said interlockable male elements comprises a bolt slidably and rotatably mounted on said top member, the axis of said bolt being parallel to the top surface of said top member, perpendicular to the adjacent table edge, and spaced from said top surface a distance equal to the distance of said keeper slot from said top surface, a flat lug parallel to the axis of said bolt extending radially from the outer end of said bolt, a handle on the inner end of said bolt, a spring urging said bolt inwardly from the adjacent table edge, said bolt having a first rotated position with said lug aligned with the keeper slot of a cooperating female element on an adjacent like table and a second rotated position with said lug perpendicular to said keeper slot; whereby two of said tables may be fastened together in edge to edge relationship by turning said bolt to its first rotated position, moving it outwardly against said spring to move said lug through said keeper slot, and turning said bolt to its second rotated position.

References Cited in the file of this patent

UNITED STATES PATENTS

| | | |
|---|---|---|
| 2,596,663 | Duffy | May 13, 1952 |
| 2,694,609 | Trafford | Nov. 16, 1954 |
| 2,704,236 | Mahr | Mar. 15, 1955 |
| 2,705,179 | Hodgin | Mar. 29, 1955 |
| 2,723,171 | Carder | Nov. 8, 1955 |

FOREIGN PATENTS

| | | |
|---|---|---|
| 618,804 | Great Britain | Feb. 28, 1949 |
| 1,063,758 | France | May 6, 1954 |